United States Patent [19]
Oelschlager et al.

[11] 3,899,488
[45] Aug. 12, 1975

[54] 2H-INDAZOLONE COMPOUND

[75] Inventors: Herbert Oelschlager; Uwe Matthiesen, both of Frankfurt am Main; Wilhelm A. Behrendt, Marburg, all of Germany

[73] Assignee: Firma Temmler-Werke, Marburg, Germany

[22] Filed: Feb. 9, 1973

[21] Appl. No.: 330,947

Related U.S. Application Data

[62] Division of Ser. No. 163,508, Aug. 16, 1971, abandoned.

[30] Foreign Application Priority Data

July 17, 1970 Germany............................. 2035494
July 10, 1971 Germany............................. 2134592

[52] U.S. Cl....................... 260/247.5 EP; 424/248

[51] Int. Cl.$^2$....................................... C07D 231/00
[58] Field of Search........................... 260/247.5 EP

[56] References Cited
UNITED STATES PATENTS
3,637,738   1/1972   Oschwend et al.......... 260/247.5 EP

*Primary Examiner*—Lorraine A. Weinberger
*Assistant Examiner*—Richard D. Kelly
*Attorney, Agent, or Firm*—Toren, McGeady and Stanger

[57] ABSTRACT

A novel 2H-indazolone-3 compound in the form of 3-(β-morpholino-ethoxy)-4,5,6,7-tetrahydro-2H-indazole or the hydrobromide thereof. This compound is analgetically highly effective and may be produced in a high purity.

1 Claim, No Drawings

2H-INDAZOLONE COMPOUND

CROSS REFERENCE TO PRIOR APPLICATION

This is a divisional of application Ser. No. 163,508, filed July 16, 1971, now abandoned.

SUMMARY OF THE INVENTION

This invention relates to a novel chemical compound of 2H-indazolone-3 and more particularly to 3-($\beta$-morpholinoethoxy)-4,5,6,7-tetrahydro-2H-indazole according to the following formula:

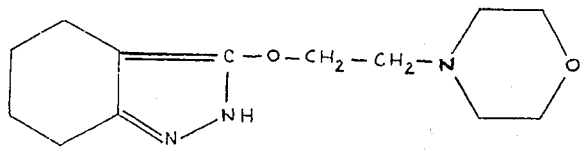

Heretofore, numerous "light" analgetica and antipyretica are known. The perhaps most widely known analgetica are acetylsalicylate, phenacetine and pyrazolone derivates. A disadvantage of analgetica of this type is, however, that these analgetica are not very well compatible. There is therefore an urgent need for a so-called "light" analgeticum which is of a better compatibility than the heretofore known analgetica and which if possible surpasses these known preparations with regard to its effectivity.

It is therefore an object of the present invention to provide a novel chemical compound.

It is another object of the invention to provide a novel chemical compound which is analgetically and antipyretically highly effective.

It is a further object of the invention to provide a novel chemical compound which is of a very good compatibility.

It is a further object of the present invention to provide a novel chemical compound that is highly effective.

It is another object of the present invention to provide a novel chemical compound which may be produced in a simple process and with a high yield and maximum purity.

Surprisingly, it has now been discovered that the novel chemical compound 3-($\beta$-morpholino-ethoxy)-4,5,6,7-tetrahydro-2H-indazole or the hydrobromide thereof is highly effective.

In accordance with another feature of the present invention this compound may be administered in combination with an inert carrier as a drug.

The compound of the present invention may be produced by means of a process which is economical, may be carried out readily and furthermore results in a relatively very high yield while obtaining a product having a maximum purity. This process comprising suspending in absolute dioxane the potassium enolate of the 2H-indazolone-3 obtained in vacuum from 2H-indazolone-3 and an equimolar amount of KOH in methanol, after evaporation of the solvent, then adding freshly prepared morpholino-ethyl-chloride obtained by alkylation from the hydrochloride, stirring the mixture in a nitrogen atmosphere at a temperature of about 100°C, removing the solvent, mixing the residue with water, extracting the residue by means of ether, evaporating the ether extract to dryness and dissolving the thus obtained colorless oil in acetone and adding petroleum ether until the solution becomes cloudy.

As may be seen from the test results shown in the following tables I, II, III and IV, the compound of the present invention meets the above stated demands since this compound while having a better compatibility is more effective than the comparative substances.

According to the values shown in Tables I and III the toxicity and the analgetic effect were determined on male NMRI mice having a body weight from 18 to 20 grams. The mice were kept without food during a period of 18 hours prior to the commencement of the tests. The test substances were administered orally in a methyl-cellulosis-mucic (slime) by means of a probe. The observation period for the toxicity tests was 7 days. The determination of the analgetic effect was performed by the hot plate test (modified according to G. WOOLFE and A. D. McDONALD: J. Pharmacol. exp. Ther., 80, 300, 1944) as well as by means of the so-called "writhing tests" in which lactic acid (0.2 ml, 2 per cent, i.p.) was used as noxe (G. WILHELMI and R. GDYNIA: Arzneimittelforschung, 18, 1525, 1968). The pre-medication periods were 60 minutes in the first test arrangements. In the "writhing tests" the test substances were administered 20 minutes prior to the i.p. injection of lactic acid, and 10 minutes later, i.e. 30 minutes after the administration of the substances, the number of animals was determined with the so-called "writhing syndrom" did not show up. The percentage of the non-reacting animals was used to compute the $ED_{50}$. In the hot plate tests in which the hot plate had a temperature of 56°C the reaction periods of the treated mice was compared once with the values of control F. animals whereby licking of the hind paws was regarded as the assessment criterion for the effect of the thermal stimulation. Since the reaction periods of the control group animals were log-normally distributed an analgetic effect was assumed in the treated animals if the logarithm of the reaction period of an animal was above the mean value range plus twice the standard deviation of the control group animals. The percentage of animals per dosage for which an analgetic effect was determined in this manner served to compute the $ED_{50}$, according to the method by J. T. LITCHFIELD and L. WILCOXON (J. Pharmacol., exp Ther., 96, 99, 1949).

TABLE I

Toxicity and analgetic effect on the mouse (oral application, dosage specifications in mg:kg body weight, relative to effective substance)

| Substance | Mean lethal dosage ($LD_{50}$) | Mean effective dosage ($ED_{50}$) and relative therapeutic index in the experimental arrangements | | | |
|---|---|---|---|---|---|
| | | Hot plate | | Writhing Test | |
| | | $ED_{50}$ | Th.I. | $Ed_{50}$ | Ih.I. |
| 3-($\beta$-morpholino-ethoxy)-1H-indazole-hydrobromide | 615 | 142 | 3,53 | 46 | 1,30 |
| Codeine phosphate | 265 | 115 | 1,49 | 14 | 1,92 |
| Acetylsalicylate | 835 | 500 | 1,67 | 107 | 0,80 |
| Aminophenazone | 550 | 283 | 1,00 | 50 | 1,00 |
| Phenacetine | 1250 | 530 | 1,71 | 107 | 0,66 |

Th.I. = therapeutic index ($LD_{10}/ED_{90}$), relative to aminophenazone = 1,00

TABLE II

Analgetic effect on rats (p.o. application, dosage specifications in mg:kg body weight, relative to effective substance

| Substance | Mean effective dosage ($ED_{50}$) | Relative effectivity, relative to aminophenazone = 1,00 |
|---|---|---|
| 3-($\beta$-morpholino-ethoxy)-1H-indazole-hydrobromide | 34 | 6.84 |
| Codeine phosphate | 22 | 10.50 |
| Acetylsalicylate | 340 | 0.67 |
| Aminophenazone | 229 | 1.00 |
| Phenacetine | 123 | 1.86 |

TABLE III

Toxicity and analgetic effect on the mouse (oral application, dosage specifications in mg:kg body weight)

| | Mean lethal dosage ($LD_{50}$) | Mean effective dosage ($ED_{50}$) and relative therapeutic index [+]) in the experimental arrangements | | | |
|---|---|---|---|---|---|
| | | Hot plate | | Writhing Test | |
| | | $ED_{50}$ | Th.I.[+]) | $ED_{50}$ | Th.I.[+]) |
| 3-($\beta$-morpholino-ethoxy)-4,5,6,7-tetrahydro-2H-indazole | 1720 | 540 | 2.67 | 94 | 2.07 |
| Acetylsalicylate | 835 | 500 | 1.88 | 107 0.91 | |
| Aminophenazone | 550 | 283 | 1.00 | 50 | 1.00 |
| Phenacetine | 1250 | 530 | 1.93 | 107 | 0.74 |

[+]) relative therapeutic index = $LD_{10}/ED_{50}$, relative to aminophenazone = 1.00

TABLE IV

Toxicity and analgetic effect on the rat (oral application, dosage specifications in mg:kg body weight

| Substance | Mean lethal dosage ($LD_{50}$) | Mean effective dosage ($ED_{50}$) in the experimental arrangement of HERTZ (electrical stimulation of the root of the tail) | |
|---|---|---|---|
| | | $ED_{50}$ | Relative therapeutic index [+]) |
| 3-($\beta$-morpholino-ethoxy)-4,5,6,7-tetrahydro-2H-indazole | 1600 | 143 | 1.62 |
| Acetylsalicylate | 1400 | 340 | 0.28 |
| Aminophenazone | 1350 | 229 | 1.00 |

[+]) Relative therapeutic index = $LD_{10}/ED_{50}$, relative to aminophenazone = 1.00

According to Table II and with reference to the method described by A. HERZ (Naunyn-Schmiedeberg's Arch. Pharmakol., 242, 414, 1962) with rats by electrical stimulation of the root of the tail by means of continuously increasing the electric current a threshold of pain was determined which threshold was characterized in that the animals commenced to squeak in synchronism with the stimulation. When maintaing the selected test conditions these threshold values indicated as per cent variations against the initial values prior to the treatment remained practically constant over a period of several hours in a test with control animals. Since these values are furthermore also normally distributed it is possible to quantitatively determine analgetic effects by determining the number of animals whose threshold values exceed during a test run the range defined by the mean value plus twice the standard deviation.

To determine the mean effective dosage ($ED_{50}$) determinations of the threshold of pain were made in 30 minutes intervals with groups of 12 female rats each, each rat having a body weight from 160 to 360 grams, and these determinations were made prior to as well as after the treatment with at least 3 doses of the test substances which were administered orally in a 2 per cent methyl-cellulosis-mucic by means of a probe. Thereby the number of animals per dosage was determined which animals exhibited in at least three successive readings an increase of the threshold of pain of 14 percent or more (analgetic effect). In this manner, not only the intensity but also the duration of the effect were taken into consideration when determining the $ED_{50}$, since the analgesia must be sustained for at least 90 minutes. Apart from the $ED_{50}$ values and the mean lethal dosages the Table III also shows, for better clarity, the relative therapeutic indices of the various compared substances, relative to amino-phenazone.

The Tables III and IV indicate the test results for the 3-($\beta$-morpholino-ethoxy)-4,5,6,7-tetrahydro-2H-indazole according to the present invention. These results are based upon tests which were different from the above described tests.

The Example described in the following serves to illustrate how the novel chemical compound of the present invention may be produced.

EXAMPLE 50 millimoles of potassium enolate of the 2H-indazolone-3 obtained from 2H-indazolone-3 and an equimolar amount of KOH in methanol, after evaporation of the solvent in a vacuum, are suspended in 100 ml of absolute dioxane. 55 millimoles of β-morpholino-ethyl-chloride freshly prepared by alkylation from the hydrochloride are then added, and the mixture is stirred in a nitrogen atmosphere during 6 hours at 100°C. After cooling and removing the solvent in vacuum the residue is mixed with water and extracted by means of ether. The ether extract is then vibrated with silica gel (0.2 – 0.5 mms, Merck) and subsequently filtered and concentrated to dryness. The thus obtained pale oil is dissolved in a small amount of benzene and mixed with a large quantity of petroleum ether, and then crystallization initiates. 3-(β-morpholino-ethoxy)-4,5,6,7-tetrahydro-2H-indazole:
Colorless crystals
FP. 65°C.
Yield 68 percent of the theoretical value
Analyses of non-recrystallized final products according to the present invention show a good degree of purity in thin layer chromatography and infrared spectroscopy (C=O frequency) investigations.

Hydrobromide: 149°C to 153°C, from isopropanol/ether.

As illustrated in the above Example, the novel chemical compound may be obtained with a high yield and in a maximum purity. No yield reducing distillations or purifications via a salt are required.

What is claimed is:

1. 3(β-morpholino-ethoxy)-4,5,6,7-tetrahydro-2H-indazole as represented by the formula:

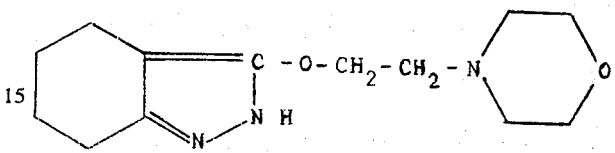

and the hydrobromide thereof.

* * * * *